United States Patent [19]

Schlaegel

[11] Patent Number: 4,910,907

[45] Date of Patent: Mar. 27, 1990

[54] HARNESS FOR BAIT

[76] Inventor: Gene A. Schlaegel, 1810 Winston Dr., Iowa City, Iowa 52240

[21] Appl. No.: 372,620

[22] Filed: Jun. 28, 1989

[51] Int. Cl.$^4$ ............................................. A01K 83/06
[52] U.S. Cl. ..................................................... 43/44.6
[58] Field of Search .......................... 43/44.6, 44.4, 36

[56] References Cited

U.S. PATENT DOCUMENTS

| | | | |
|---|---|---|---|
| 740,416 | 10/1903 | Gebhardt | 43/44.6 |
| 2,010,598 | 8/1935 | Leighton . | |
| 2,157,333 | 5/1939 | Hadaway . | |
| 2,582,646 | 1/1952 | Moore | 43/44.2 |
| 2,588,526 | 3/1952 | Hoage | 43/44.6 |
| 2,894,351 | 7/1959 | Doane | 43/44.6 |
| 2,926,453 | 3/1960 | Miller et al. | 43/44.6 |
| 2,927,393 | 3/1960 | Flamisch et al. | 43/44.6 |
| 3,105,319 | 10/1963 | Whalen | 43/44.4 |
| 3,293,799 | 12/1966 | Konomos | 43/44.2 |
| 3,415,004 | 12/1968 | Whalen | 43/44.6 |
| 3,457,666 | 7/1969 | Klinkhamer | 43/41 |
| 3,645,031 | 2/1972 | Egles | 43/44.2 |
| 4,067,135 | 1/1978 | Martin | 43/43.14 |
| 4,189,860 | 2/1980 | Ebert | 43/42.29 |
| 4,796,376 | 1/1989 | Schlaegel | 43/42.29 |

Primary Examiner—M. Jordan
Attorney, Agent, or Firm—Morton S. Adler

[57] ABSTRACT

A bait harness adapted to hold a bait in the form of a fish or fillet is provided for casting, trolling or jigging. The harness includes a clamp of highly resilient spring material bent to define a closed end with integral opposed sides converging to free ends biased to an abutting closed position for gripping the bait. In one embodiment, the clamp is provided with a pair of elongated arms, each fitted with a prong, pivotally mounted respectively at one end to respective free ends of the clamp to open the same when pressed into engagement with opposed sides thereof. This embodiment is used with an elongated skewer impaled lengthwise through the bait fish or fillet so as to extend from the extremities thereof and the bait is secured by mounting the clamp to the leading end of the skewer so that the free ends of the clamp when closed tightly grip the bait and when the arms are closed, the prongs penetrate the bait for additional gripping. The trailing end of the skewer carries a fish hook and the leading end will receive a fishing line. The clamp is designed so that, when closed, the skewer cannot be detached. Additional hooks can be attached to the clamp. In a second embodiment, also used with a skewer, the arm adjacent one side of the clamp is replaced by a buoyant artificial fishing plug attached to said side to provide for variation in fishing techniques.

22 Claims, 3 Drawing Sheets

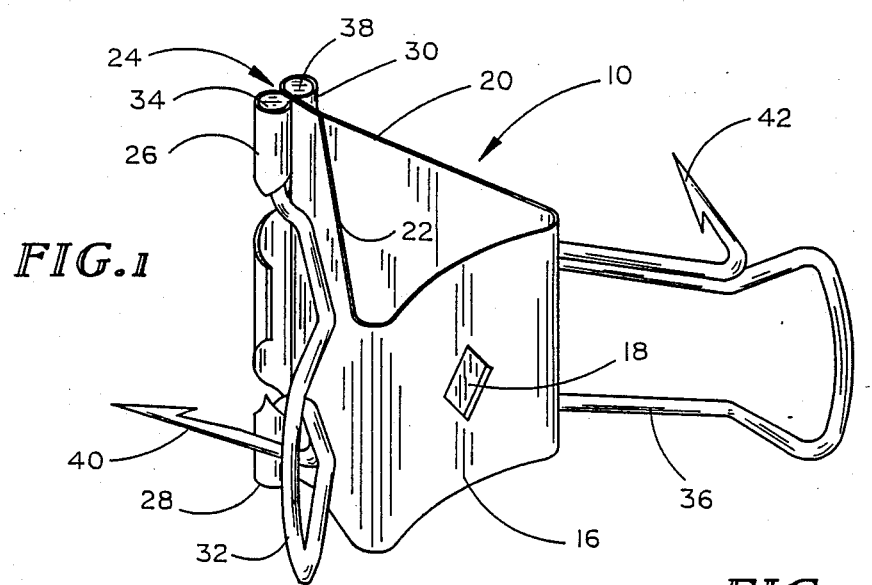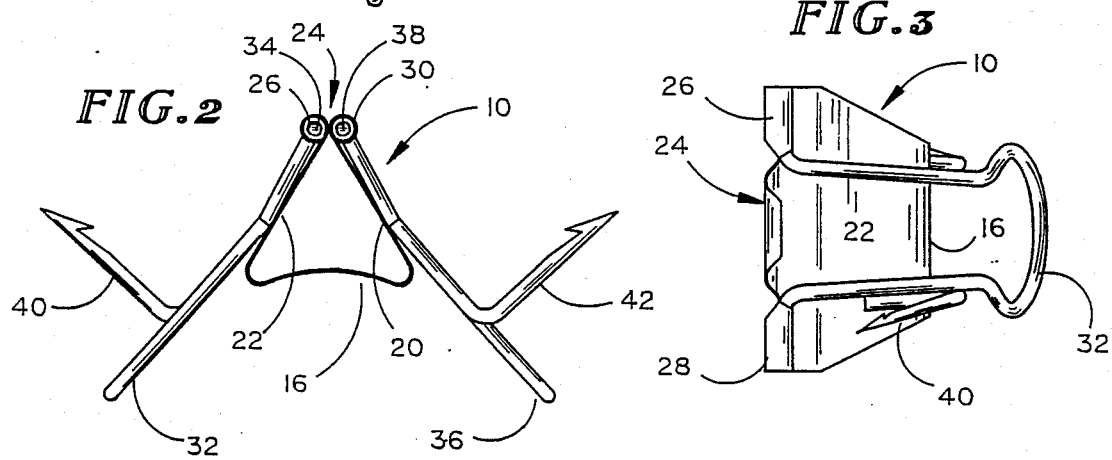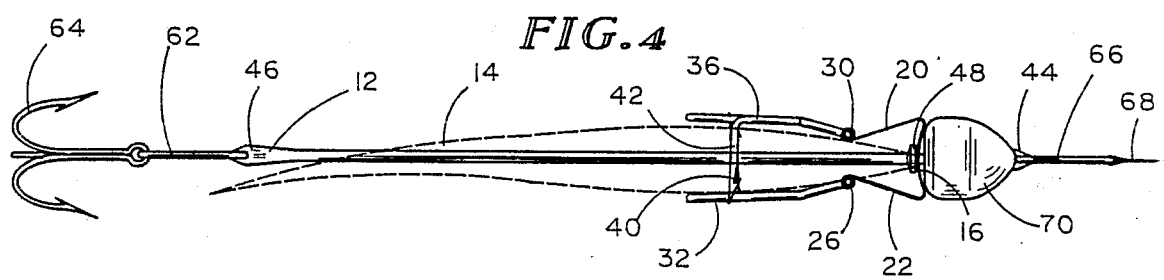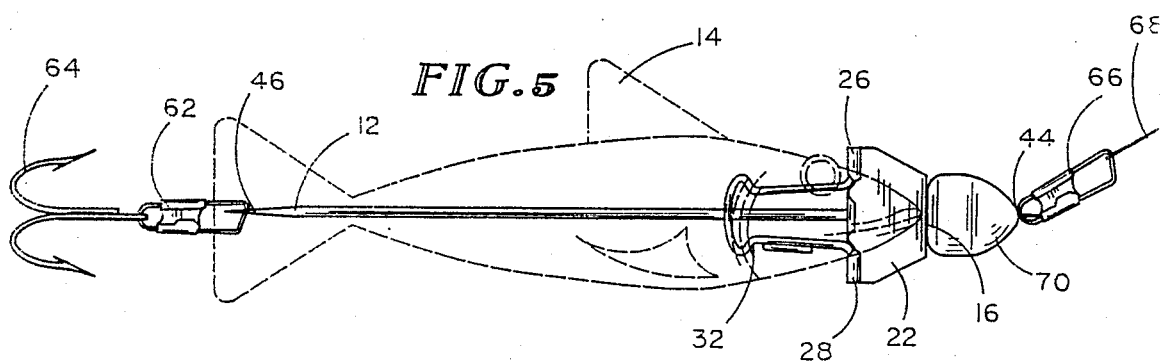

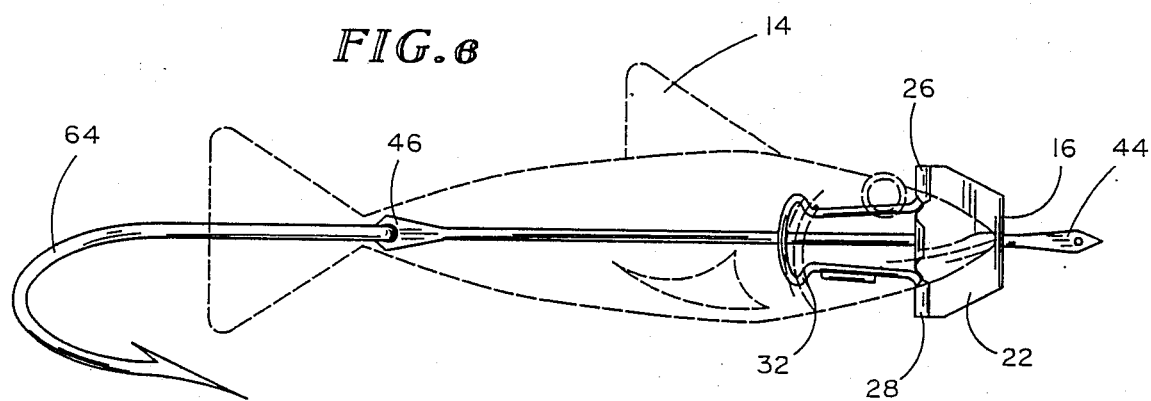
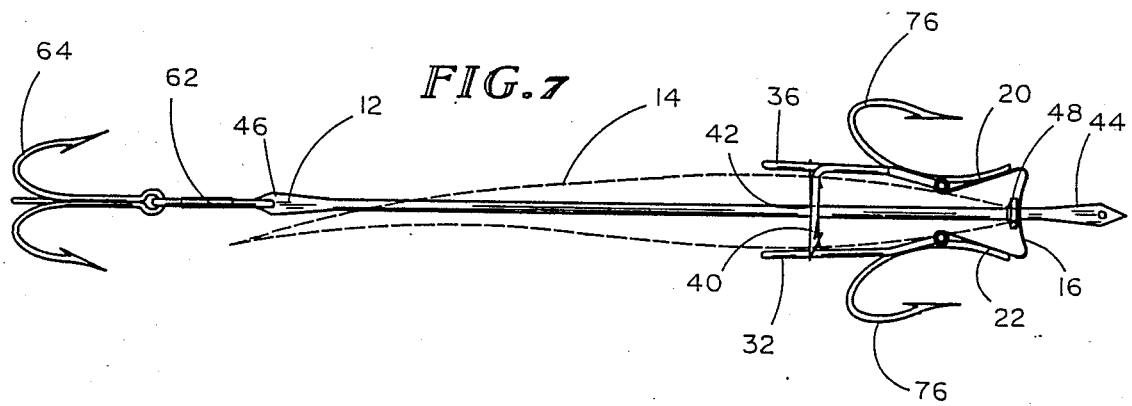
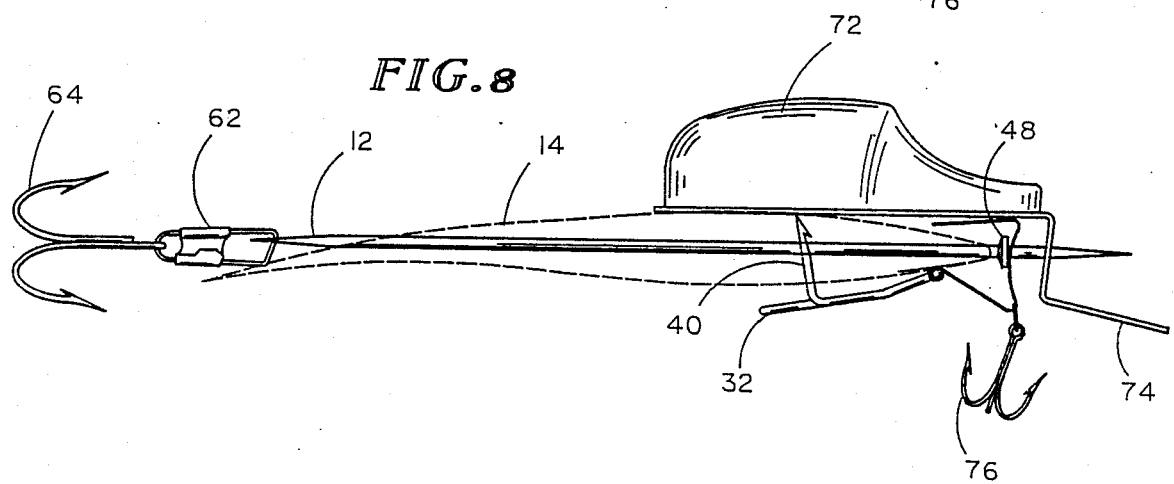
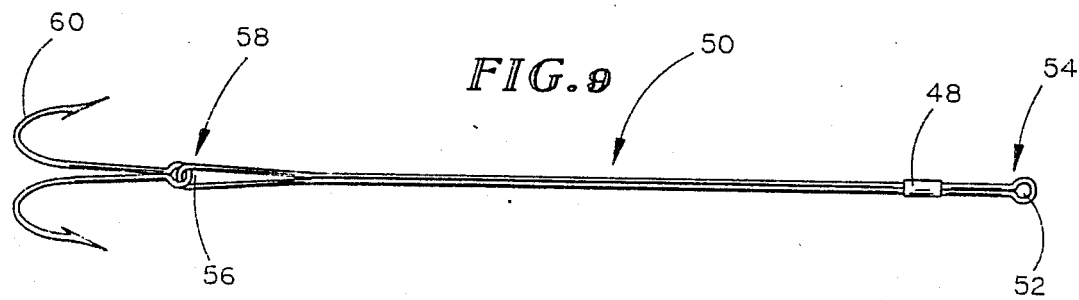

4,910,907

HARNESS FOR BAIT

BACKGROUND OF THE INVENTION

This invention relates to fishing devices and more particularly to improvements on the harness for a bait fish disclosed in my U.S. Pat. No. 4,796,376.

Harnesses for bait fish have long been used in a variety of forms and shapes as exemplified in U.S. Pat. Nos. 4,189,860, 3,293,790, 2,582,646 and 3,457,666 and one of the important objects of this invention is to provide improvements in construction, design and versatility of use of such a harness as compared with those presently in use.

Other objects herein are to provide a harness as characterized that has a minimum of parts for economy in manufacture, is simple and ease to use and is extremely efficient for its intended purpose.

A further object is to provide a device of the above class that is adapted for use with bait fish of varying sizes.

More particularly, it is an object of this invention to provide a harness for a bait fish that includes a clamp of highly resilient spring material bent to define a closed end with integral opposed sides converging to free ends biased to an abutting closed position for gripping the bait and provided with prong fitted arms movable in one direction for opening said free ends and movable in the opposite direction so the prongs will penetrate the bait for additional gripping capability. In one embodiment, the clamp operably engages a skewer of any selected length that is impaled lengthwise of the bait; in a second embodiment also used with a skewer, one arm is replaced by an artificial lure for diversity in fishing techniques, and in a third embodiment for which no skewer is used or needed, the clamp also has one arm replaced by an artificial lure fitted with a plurality of depending barbs and includes an elongated prong fitted shank for gripping and penetrating the bait fish.

A further object is to provide a harness as characterized that, when used with a skewer, includes means to prevent the skewer from being disengaged from the clamp.

A further object is to provide a skewer for this harness that can be used with single, double or treble hooks.

Yet another object is to provide a harness as characterized that is adapted to carry other fishing attractants such as a rubber skirt and the like and also a weight, if desired.

SUMMARY

In accordance with this invention, a bait harness adapted to hold a bait in the form of a fish or fillet is provided for casting, trolling or jigging. The harness includes a clamp of highly resilient spring material bent to define a closed end with integral opposed sides converging to free ends biased to an abutting closed position for gripping the bait. In one embodiment, the clamp is provided with a pair of elongated arms, each fitted with a prong, pivotally mounted respectively at one end to respective free ends of the clamp to open the same when pressed into engagement with opposed sides thereof. This embodiment is used with an elongated skewer impaled lengthwise through the bait fish or fillet so as to extend from the extremities thereof and the bait is secured by mounting the clamp to the leading end of the skewer so that the free ends of the clamp when closed tightly grip the bait and when the arms are closed, the prongs penetrate the bait for additional gripping. The trailing end of the skewer carries a fish hook and the leading end will receive a fishing line. The clamp is designed so that, when closed, the skewer cannot be detached. Additional hooks can be attached to the clamp. In a second embodiment, also used with a skewer, the arm adjacent one side of the clamp is replaced by a buoyant artificial fishing plug attached to said side to provide for variation in fishing techniques. A third embodiment modifies the second embodiment by providing the fishing plug with a trailing tail to receive a fish hook and a plurality of depending spaced pointed barbs. A hook may be attached to the clamp, if desired. Securely attached to the arm side of the clamp is an elongated shank fitted with an angularly disposed prong whereby the clamp can be secured to the bait and the prongs on the arm and the shank and the barbs on the plug penetrate the bait to securely hold it in place. A skewer is not used not needed with the third embodiment.

the foregoing objects and such further objects as may appear herein, or be hereinafter pointed out, together with the advantages of this invention will be more fully discussed and developed in the more detailed description of the accompanying drawings.

BRIEF DESCRIPTION OF THE DRAWINGS

FIG. 1 is a perspective view of one embodiment of the bait fish engaging clamp according to this invention, FIG. 2 is a plan view from the top of FIG. 1, FIG. 3 is a side elevational view of the device shown in FIG. 1, FIG. 4 is a top view of the clamp in FIG. 1 coacting with a skewer for securing a bait fish, FIG. 5 is a side elevational view of the showing in FIG. 4, FIG. 6 is a side elevational view similar to FIG. 5 but showing the use of a single hook used when the trailing end of the skewer is drawn into the bait fish, FIG. 7 is a view similar to FIG. 4 but showing additional fish hooks on the clamp, FIG. 8 is a side elevational view of a second embodiment of this invention showing a fishing plug attached to the clamp and illustrating a fish hook depending from the clamp and the arms of the clamp in closed position, FIG. 9 is an elevational view of a modified form of a skewer usable with this invention.

DESCRIPTION OF THE PREFERRED EMBODIMENTS

Figure 10:
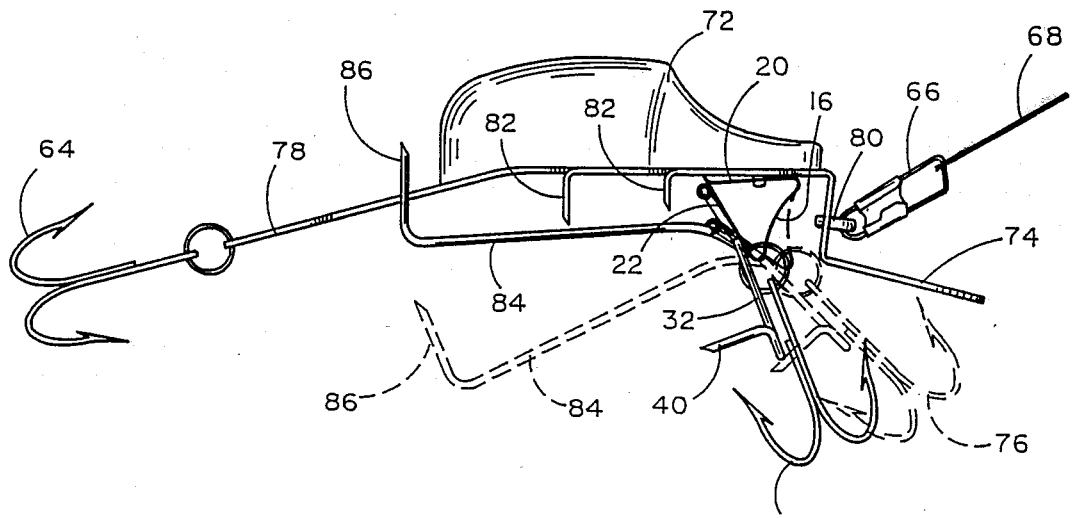
FIG. 10 is a side elevational view of a third embodiment of this invention showing the plug and clamp of FIG. 8 modified for use without a skewer.

Referring to the drawings, the embodiment of the clamp in this invention designated by the numeral 10 as best seen in FIGS. 1,2 is adapted for use with a skewer 12 for holding a bait fish 14 and is more particularly described as follows.

Clamp 10 is a modification of what is generally referred to as a binder clip and includes a body of highly resilient flat spring material bent to define a closed end 16 which is centrally apertured as at 18, and integral sides 20, 22 converging so their free ends are normally biased to abutting closed position as indicated at 24. The outer end portions on the outer surface of side 22 are bent up and around to form the respective collars 26, 28 and side 20 is similarly formed for which one such collar 30 is shown in FIG. 1 opposite collar 26 and it will be understood a similar collar is provided opposite collar 28. An elongated generally U-shaped arm 32 has each free end bent perpendicularly outward to form the stub shafts 34 that are pivotally journalled in the respective collars 26, 28 so as to be movable into and out of engagement with side 22 (FIG. 3) or in the opposite direction so as to project from clamp 10 as will later appear and a like arm 36 with stub shafts 38 is similarly arranged relative to side 20. Arms 32, 36 have the respective perpendicularly projecting barbed prongs 40, 42 that extend outwardly relative to clamp 10 when positioned as seen in FIG. 3 and will thus be in an opposed relationship when they are fully moved in the opposite direction as will become apparent.

The skewer 12 used with this harness is of an elongated needle-like configuration, preferably pointed and apertured at both its leading end 44 and trailing end 46 as seen in FIG. 4, and is provided with a concentrically enlarged stop or collar 48 spaced a short distance inwardly from the leading end 44. Such skewer 12 can be of any desired length depending upon the requirement according to the length of the bait fish 14 used and thus a fisherman can carry a wide assortment of sizes for use as needed with a single clamp 10. Skewer 12 as shown is of a flat bendable material for selective bending to increase the wobble of plug 72 but may be a bendable rod 50 (FIG. 9) with a collar 48 as described and with an eye 52 on its leading end 54 and a loop 56 on the trailing end 58 for hook 60. Skewer 12 is adapted to removably receive a clip 62 and hook 64 on the trailing end 46 and hooks 60, 64 may be single, double or triple as may be desired.

In using the above described harness, a skewer 12 of any selected length needed for the size of bait fish 14 chosen is impaled lengthwise and centrally of the bait fish 14 from the mouth thereof through the tail so that the collar or stop 48 is positioned in close proximity to the front of the mouth of bait fish 14. Clamp 10 is then opened by pressing the closed ends of the arms 32, 36 towards each other against the respective sides 22, 20 in which position the leading end 44 of skewer 12 is journalled through aperture 18 in clamp 10 until stop 48 abuts the inner side of closed end 16 of clamp 10 and the clamp can be tightly closed in gripping engagement with respective opposite sides of the fish's head or end of a fillet. Arms 32, 26 are then rotated to project rearwardly from clamp 10 where prongs 40, 42 will be in an opposing relationship and can be imbedded in the bait fish 14 from respective opposite sides thereof (FIG. 4) whereby bait 14 is securely positioned for casting or trolling. Any suitable hook 64 is then attached to the trailing end 46 as shown. The leading end 44 is adapted to receive a suitable clip 66 and fishing line 68, and, if desired, a weight or the like 70 can be placed on the leading end 44 as best seen in FIG. 4. Both the leading end 44 and the trailing end 46 of skewer 12 are preferably pointed as described and while this is not necessarily required, it facilitates the impalement of the skewer 12 and particularly with the leading end 44 pointed, it is helpful to those fishermen who choose to keep skewers 12 of varying lengths with hooks attached to the trailing end 46 to impale the bait 14 from tail to head.

In a second embodiment of clamp 10 as seen in FIG. 8, arm 36 on side 20 of clamp is replaced by a buoyant artificial plug lure 72 with a projecting apertured lip 74 of the type disclosed in my U.S. Pat. No. 4,796,376. With such an attached lure, the leading end 44 of skewer 12 is extended through the aperture in lip 74 and such an arrangement provides for variation in fishing techniques as is well known. Also, for additional hook capability, clamp 10 may, itself, be provided with one or more hooks 76 as seen in FIGS. 7, 8.

As described above, skewer 12 normally projects from both the head and tail of the bait fish 14 with a dangling hook 64 on the trailing end 46. Such a hook position is subject to entanglement in weeds and snag prone areas and I show in FIG. 6 an adaptation of this harness where skewer 12 is used so that the trailing end 46 can be drawn into the tail portion of the bait fish 14 to receive a single fish hook then held in general linear alignment with the direction of forward movement and thereby less likely to be snagged.

Thus far described, it will be appreciated that this harness has a minimum of parts with a maximum of gripping power on the bait provided not only by the clamp itself but by the additional gripping of the prongs 40, 42 on the clamp arms 32, 36. The bait 14 is thus held securely and cannot slide down the skewer 12 and bunch up at the trailing end 46. The stop 48 which abuts the inner side of clamp end 16 is designed large enought so it cannot pass through aperture 18 whereby the skewer 12 cannot be pulled through the clamp from the leading end 44 by a predator or the like. Likewise, a clip 66 at the outer side of clamp 10 will not pass through aperture 18 and thus provides a second stop whereby the skewer 12 cannot be pulled through clamp 10 from the trailing end 46 so that this harness is extremely effective and useful for its intended purpose.

Figure 11:
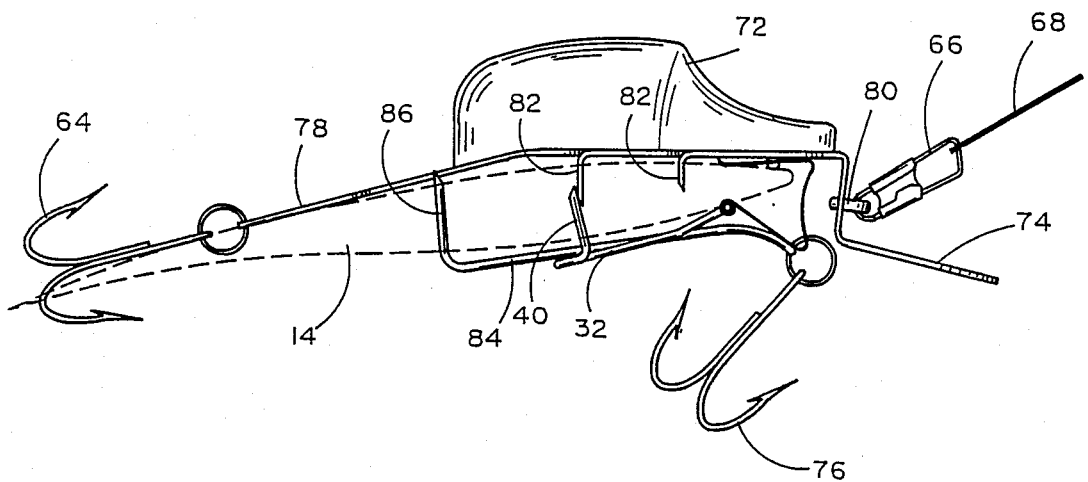
FIG. 11 is a view similar to FIG. 10 showing this harness securing a bait fish.

With reference now to FIGS. 10, 11, I show a modification of plug 72 of FIG. 8 as a third embodiment that does not use or require a skewer 12 and in describing this embodiment, like numerals will be given to like parts previously described.

The relationship of plug 72 and arm 32 with prong 40 on clamp 10 is the same as previously described. However, in this third embodiment, plug 72 is provided with an elongated bendable tail 78 to receive a hook 64, an eye hook 80 on lip 74 to receive a clip 66 and fishing line 68 and a plurality of depending spaced barbs 82 as shown. An elongated shank 84 is secured at one end portion to side 22 of clamp 10 intermediate collars 26, 28 and projects therefrom to a point near or beyond the rear of plug 72 to terminate in an upturned preferably bifurcated prong 86.

With the above modifications, clamp 10 in the third embodiment is easily opened to the dotted line position shown in FIG. 10 by pressing arm 32 against side 22 towards plug 72 to simultaneously open shank 84 and in which position as seen in FIG. 11, bait 14 is secured by the combined gripping capability of the penetrating prongs 40, 86 and barbs 82 on plug 72 at a plurality of spaced points intermediate the length of the bait 14 as well as by the clamp 10, itself. The easy manipulation of clamp 10 facilitates not only the original attachment of a bait 14 but the quick and easy replacement thereof if it is damaged by a strike or snag and the bendability of tail 78 permits it to be selectively bent for enhancing the wobble and side to side action of plug 72 when it is pulled through the water. Accordingly, in view of the foregoing, it is thought a full understanding of the construction and operation of this invention will be had and the advantages of the same will be appreciated.

I claim:

1. A harness to secure a bait fish for casting or trolling, comprising:
   a clamp of highly resilient spring material bent to form a closed end and with the respective free ends thereof biased to abutting closed position,
   means for opening said clamp,
   said closed end provided with an aperture,
   an elongated skewer, apertured on each end, for impalement lengthwise of a bait fish so as to protrude from the respective extremities thereof,
   said skewer defining a leading end and a trailing end,
   with said clamp open, the leading end of said skewer journalled through the aperture in said clamp whereby said clamp can be closed in gripping engagement with said bait fish, and
   said trailing end adapted to receive a fish hook and said leading end adapted to receive a fishing line.

2. A device as defined in claim 1 including means to prevent said skewer from being pulled through said clamp.

3. A device as defined in claim 2 wherein the means to prevent said skewer from being pulled through said clamp includes a stop member on said skewer disposed at one side of said clamp and incapable of passing through said aperture in said clamp in one direction.

4. A device as defined in claim 3 including:
   said stop member being fixed to said clamp, and
   a second stop member removably attachable to said skewer at the opposite side of said clamp and incapable of passing through said aperture in said clamp from the opposite direction.

5. A device as defined in claim 1, including:
   a prong associated with the means for opening said clamp, and
   with said clamp closed on said bait fish said prong being positionable to penetrate said bait fish.

6. A device as defined in claim 1 including a fish hook on said clamp.

7. A device as defined in claim 1, including:
   spaced prongs associated with the means for opening said clamp, and
   with said clamp closed on said bait fish said prongs being positionable to penetrate respective opposed sides of said bait fish.

8. A device as defined in claim 1 including a buoyant fishing plug carried by said clamp.

9. A device as defined in claim 1 including a weight means carried by said skewer adjacent said clamp.

10. A harness to secure a bait fish for casting or trolling, comprising:
    a clamp of highly resilient spring material bent to form a closed end and integral converging sides with the respective free ends thereof biased to abutting closed position,
    said closed end provided with an aperture,
    opposed elongated arms respectively pivotally mounted at one end to said respective open ends of said clamp,
    an elongated skewer defining apertured leading and trailing end for impalement lengthwise of a bait fish so that said leading end protrudes from the head of said bait fish,
    with said clamp open said leading end of said skewer journalled through the aperture in said clamp whereby said clamp can be closed in gripping engagement with said bait fish,
    a respective prong on each arm,
    said arms movable in one direction to engage respective opposite sides of said clamp for opening the same and movable in the opposite direction to effect imbedding said prongs in respective opposite sides of said bait fish, and
    said trailing end adapted to receive a fish hook and said leading end adapted to receive a fishing line.

11. A device as defined in claim 10 including means to prevent said skewer from being pulled through said clamp.

12. A device as defined in claim 11 wherein the means to prevent said skewer from being pulled through said clamp includes a stop member on said skewer disposed at one side of said clamp and incapable of passing through said aperture in said clamp in one direction.

13. A device as defined in claim 12, including:
    said stop member being fixed to said clamp, and
    a second stop member removably attachable to said skewer at the opposite side of said clamp and incapable of passing through said aperture in said clamp from the opposite direction.

14. A device as defined in claim including a fish hook on said clamp.

15. A device as defined in claim 10 including a buoyant fishing plug carried by said clamp.

16. A device as defined in claim 10 including a weight means carried by said skewer adjacent said clamp.

17. A harness for securing a bait fish for casting or trolling, comprising:
    a clamp of highly resilient spring material bent to form a closed end and integral converging sides with respective free ends thereof biased to abutting closed position,
    an elongated arm pivotally mounted at one end to one end of said clamp and movable towards and away from one side thereof to open the same,
    a prong on said arm,
    an artificial fishing plug having a leading end and a trailing end secured to the other side of said clamp,
    an elongated tail secured to and extending from said trailing end to receive a fish hook,
    said leading end adapted to receive a fishing line, and
    said clamp openable to embrace and grip a portion of said bait with said arm movable so that the prong thereon penetrates another portion of said bait to securely hold it.

18. A device as defined in claim 17 including:
    an elongated shank secured to said one side of said clamp so as to project from the free end thereof and movable therewith when said clamp is opened,
    a prong on the projected end of said shank, and
    said prong penetrating said bait when said clamp is closed thereon to increase the gripping capability of said harness.

19. A device as defined in claim 18 including a plurality of depending spaced barbs on said plug adapted to penetrate the bait when said clamp is closed thereon.

20. A device as defined in claim 17 including a fish hook on said clamp.

21. A device as defined in claim 18 including said prong disposed rearwardly of the trailing end of said plug to secure said bait in a manner that the tail of a fish bait or rear of a fillet is in a remote trailing relationship to said plug.

22. A device as defined in claim 18 including said shank being bendable to selective positions to enhance the wobble and side to side action of said plug when pulled through the water.

* * * * *